United States Patent [19]

Isaksson

[11] Patent Number: 5,604,361
[45] Date of Patent: Feb. 18, 1997

[54] OPTOLECTRONIC COMPONENT WITH A WELDED JOINT AND A METHOD OF MOUNTING THEREOF

[75] Inventor: Jan Isaksson, Täby, Sweden

[73] Assignee: Asea Brown Boveri AB, Vasteras, Sweden

[21] Appl. No.: 547,321

[22] Filed: Oct. 24, 1995

[30] Foreign Application Priority Data

Oct. 25, 1994 [SE] Sweden .................................. 9403648

[51] Int. Cl.$^6$ .................................................. H01L 33/00
[52] U.S. Cl. .................. 257/99; 257/98; 385/92; 385/93; 385/90
[58] Field of Search .............................. 257/80, 81, 82, 257/99, 100, 98, 730; 385/90, 91, 92, 93, 94

[56] References Cited

U.S. PATENT DOCUMENTS 5,347,605  9/1994  Isaksson .................................. 385/92

Primary Examiner—J. Carroll
Assistant Examiner—Minhloan Tran
Attorney, Agent, or Firm—Pollock, Vande Sande & Priddy

[57] ABSTRACT

An optoelectronic component includes a housing having a first body and a second, spherical body, and an optoelectronic semiconductor element mounted in the second, spherical body. The second, spherical body is adjustably journalled in a cylindrical recess of the first body. The cylindrical recess includes an opening edge and the spherical body includes a portion having substantially the same outer periphery diameter as the diameter of the cylindrical recess at the level with the opening edge of the cylindrical body. A welded joint extends around the whole opening edge to provide a hermetically sealed joint between the opening edge and that portion of the spherical body.

8 Claims, 3 Drawing Sheets

5,604,361

OPTOLECTRONIC COMPONENT WITH A WELDED JOINT AND A METHOD OF MOUNTING THEREOF

TECHNICAL FIELD

The present invention relates to an optoelectronic component comprising a housing with a first body and an optoelectronic semiconductor element mounted in a second, spherical body which is adjustably journalled of a cylindrical recess in the first body. The diameter of the spherical body and the diameter of the cylindrical recess are substantially the same.

The present invention also relates to a method for mounting of the optoelectronic component.

BACKGROUND OF THE INVENTION

An optoelectronic component of the kind mentioned in the introductory part of the description is known, for example from U.S. Pat. No. 5,347,605. The optoelectronic component may, for example, be connectable to a light guide. The optoelectronic element may, for example, be a light-emitting diode (LED) which emits light in the light guide, or a photodetector which detects light from the light guide.

From the above-mentioned patent it is known to arrange an LED adjustably in relation to the light guide when mounting the optoelectronic component. The symmetry axis and the optical axis of the LED coincide approximately with the longitudinal axis of the light guide. The housing comprises a body with a cylindrical recess. The LED is surrounded by a mounting body in the form of a ring with a double-curved envelope surface. The envelope surface has a spherical shape with a diameter which coincides with the diameter of the recess. When mounting the component, the light guide is first mounted in the housing, whereupon the LED with a mounting ring is pushed a certain distance into the recess and is connected to a current source. The intensity of the light emitted from the far end of the light guide is measured. By rotating and axially displacing the LED with the mounting ring in the recess, it can be adjusted so as to obtain a maximum intensity value. In this position, the LED is mechanically locked to the housing with the aid of a fast-curing resin, whereafter the gap between the ring and the recess is filled having a resin with a high mechanical stability, for example epoxy resin.

One disadvantage of using resin for joining together the LED and the housing is that there is a certain risk of the joint leaking moisture or other gases. Another disadvantage is that the resin must cure for a certain time before the component endures movement, which in turn extends the mounting time. It is, therefore, desirable to join the LED and the housing together by means of a welded joint. The advantages of a welded joint are that it is completely tight, has a high mechanical strength, and needs no curing time.

When the LED, provided with a mounting ring, is to be welded to the recess, the problem arises as to where to place a welded joint. To make the welding possible, the distance between two points to be welded must not exceed a maximum distance. Since the LED with the mounting ring is inserted a certain distance into the recess, the distance from the opening edge of the recess to that point where the distance between the mounting ring and the recess is lower than the maximum distance becomes too large to make access to welding possible (see FIG. 5 in the above-mentioned patent). The adjustment of the LED along its symmetry axis also causes problems since the position of the welded joint will vary between different components.

To avoid the above-mentioned problems, attempts were made to mount the LED directly in the recess without the mounting ring. This led to the creation of a space between the LED and the recess, which made possible adjustment of the LED in directions perpendicular to its symmetry axis. That end of the LED which faces away from the light guide has a flange which runs around the whole LED. After the adjustment, the opening edge of the recess and the flange of the LED were welded to each other. However method this mounting does not provide for any axial displacement of the LED and hence for no adjustment of the LED in relation to the light guide in the axial direction. It was found that this gave such a poor adjustment of the LED that a majority of the mounted components had to be rejected. The conclusion is that an adjustment of the LED in the axial direction is necessary to obtain an acceptable luminous efficiency between the LED and the light guide.

The present invention aims to solve the problem as to how to join an optoelectronic semiconductor element provided with a mounting ring, using a method of mounting comprising adjustment of the optoelectronic semiconductor element in the axial direction, to a recess in a body to obtain a completely tight joint.

SUMMARY OF THE INVENTION

The present invention relates to an optoelectronic component of the kind described in the introduction, which offers a fast, simple and efficient adjustment of the optoelectronic semiconductor element included in the component, and provides a completely tight joint between the optoelectronic semiconductor element, the mounting ring and the body enclosed in the housing.

The present invention also relates to a method of mounting an optoelectronic component of the kind described in the introduction.

BRIEF DESCRIPTION OF THE DRAWINGS

The invention will be described in the following with reference to the accompanying FIGS. 1–3, wherein.

DETAILED DESCRIPTION OF THE PREFERRED EMBODIMENTS

Figure 1:
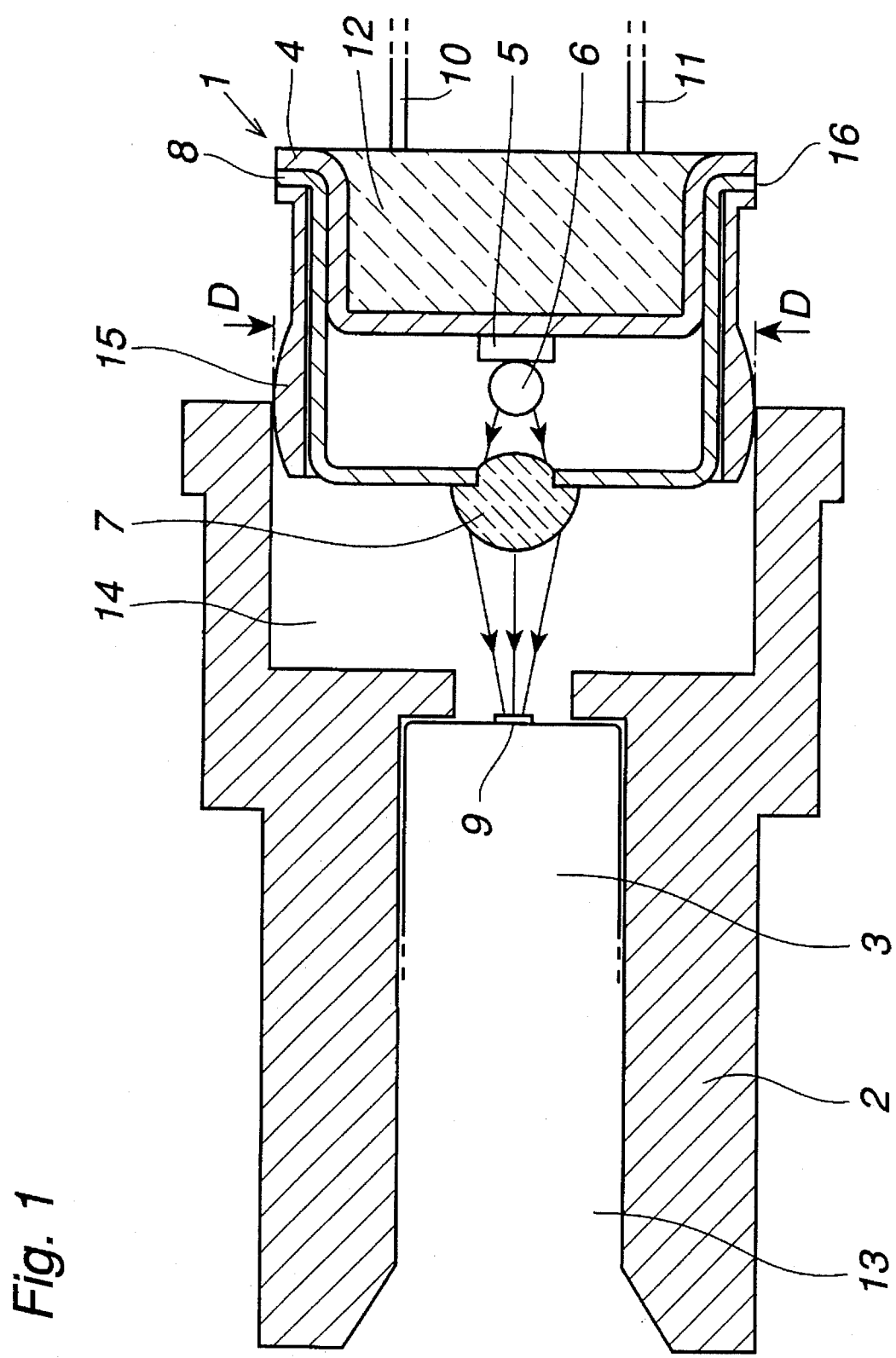
FIG. 1 shows a section through a component according to the present invention, which comprises an LED and connection means for connecting a light guide.

FIG. 1 shows an optoelectronic component which constitutes one embodiment of the present invention. The component comprises an optoelectronic semiconductor element which in this case is an LED 1. The LED is arranged in a housing 2, which is provided with means for connecting of a light guide 3. The LED is adapted to emit radiation towards the light guide for transmission therethrough.

The LED 1 has a base 4, on which is mounted a semiconductor body 5 constituting the active and light-emitting element of the LED. Adjacent to the semiconductor body there is arranged a lens 6 for focussing the radiation. Further, the LED has a cover 8 provided with an exit opening for the radiation, in which a lens 7 is arranged. The lenses 6 and 7 focus the radiation towards the optical fiber end 9 of the light guide 3. The LED is provided with schematically shown connection conductors 10, 11, and its base is filled with glass or a plastic material 12. At that end of the LED which faces away from the light guide, the base 4 and the cover 8 together form an inner flange, hereinafter referred to as light-emitting flange 16, which runs around the whole LED.

The housing 2 is made of metal and is substantially rotationally symmetrical. The housing is provided with an axial bore 13 for accommodating the light guide 3. In the right-hand part of the housing 2, as shown in the figure, the housing has a cylindrical recess 14. The symmetrical axis and the optical axis of the LED coincide approximately with the longitudinal axis of the light guide 3, hereinafter referred to as the z axis.

Figure 2:
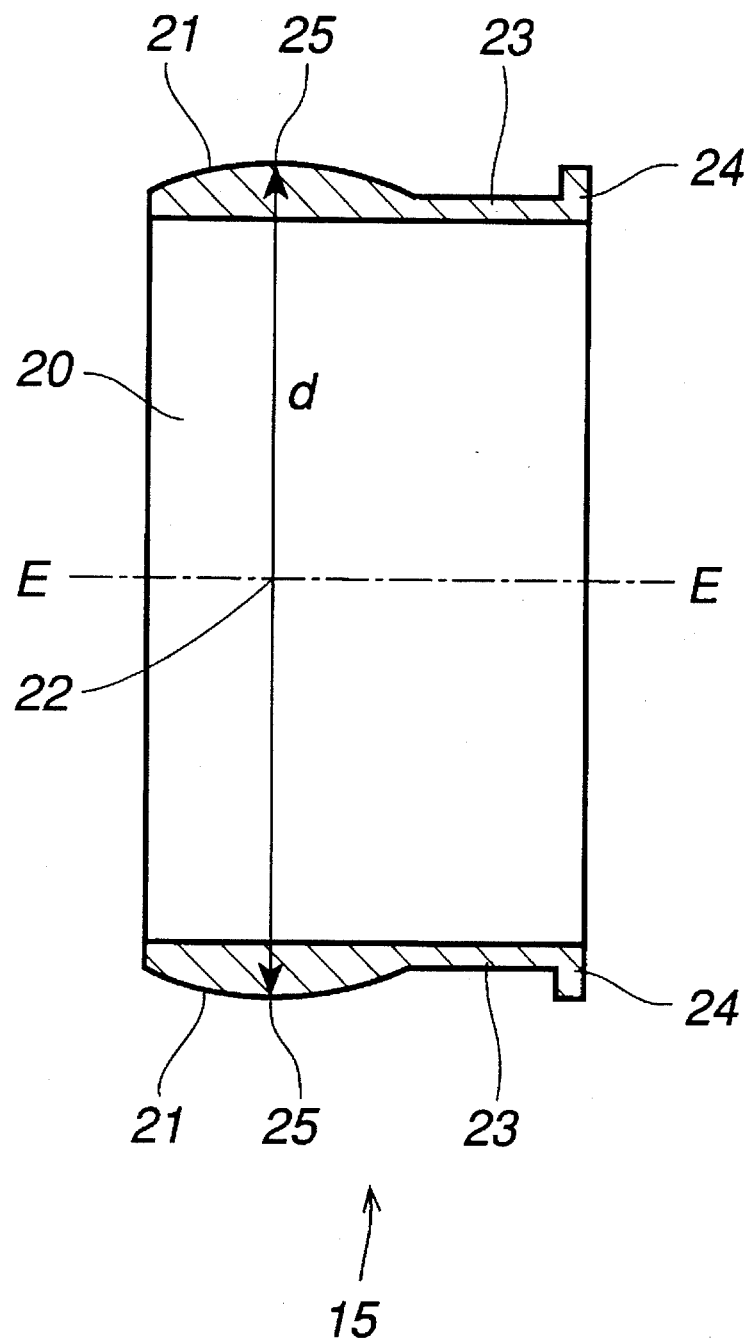
FIG. 2 shows a section through a mounting body for adjustable mounting of the LED.

The LED 1 is surrounded by a mounting body in the form of a metal ring 15 of a weldable metal, for example stainless steel. FIG. 2 shows the mounting ring 15 which is rotationally symmetrical with a symmetrical axis E—E. The mounting ring has a round hose 20 for receiving the LED 1. The left-hand part of the mounting ring, as shown in the figure, has an external envelope surface 21 with an approximately spherical shape and with a center at the point 22, and a diameter d which substantially corresponds to the diameter D of the cylindrical recess 14. The mounting ring has its largest periphery 25 where its outer circumference is equal to the diameter d of the spherically formed envelope surface. The right-hand part 23 of the mounting ring, as shown in the figure, has the shape of a straight cylinder and is provided with a flange furthest to the right, hereinafter referred to as a mounting flange 24. Flange 24 runs around the whole mounting ring.

Figure 3:
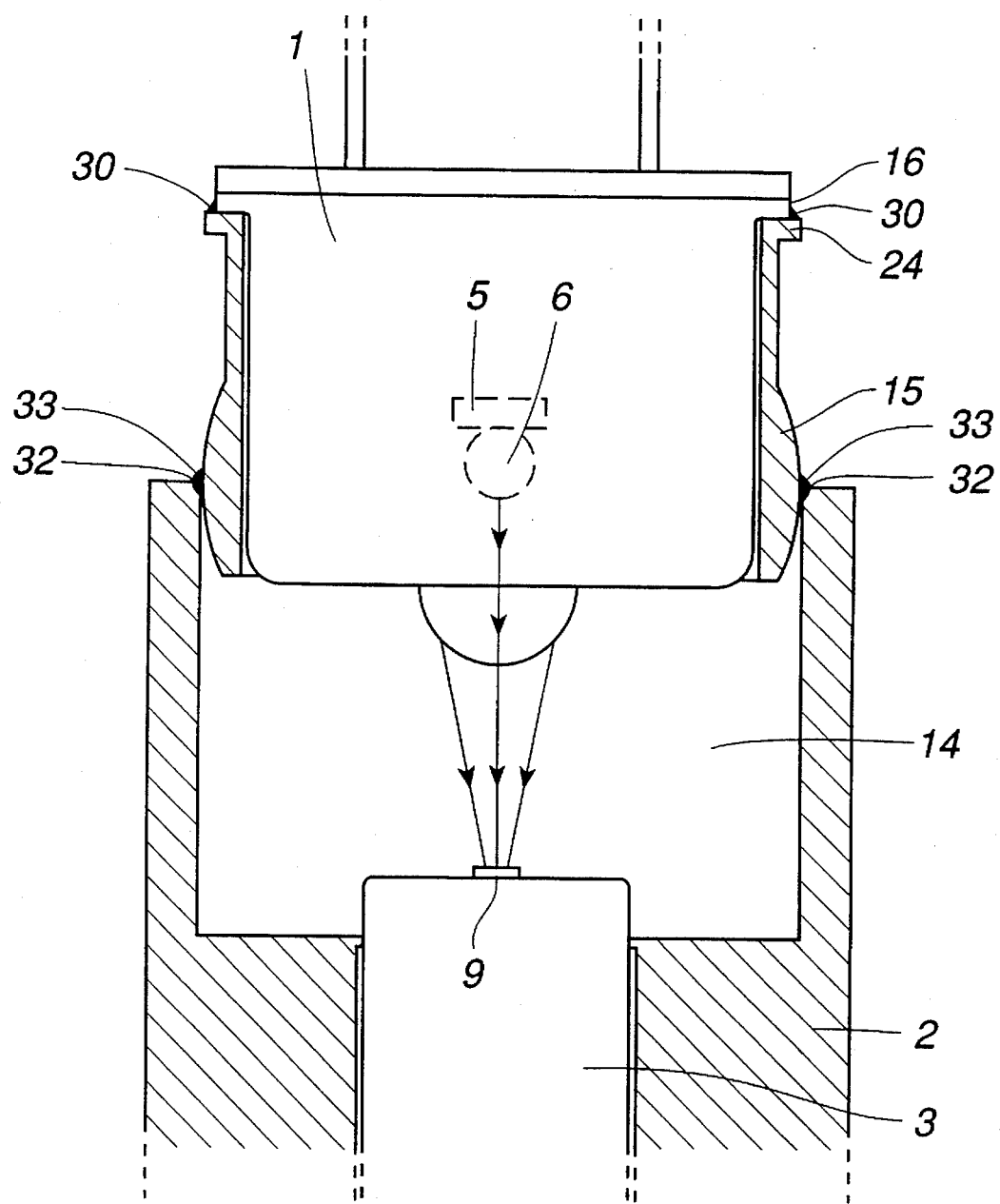
FIG. 3 shows, with reference to a section through the component, the principle of adjustment and attachment of the LED.

FIG. 3 shows that end of the housing 2 in which the LED is arranged and is intended to illustrate the mounting method. During the mounting, the LED 1 is first joined to the mounting ring 15 by welding the mounting flange 24 and the LED flange 16 to each other around the whole LED such that a hermetically sealed joint 30 is obtained. Thereafter, the LED, mounted in the mounting ring, is inserted into the recess 14 in the housing. The LED is inserted so far that that part of the mounting ring which has the largest periphery 25, that is, that part of the mounting ring which has an outer circumference corresponding to the circumference of the recess, is at a level with the opening edge 32 of the recess.

The LED is connected to a current source and is caused to emit light. Light beams emitted from the LED are focussed towards a point at the end of the light guide. In general, this point will not be located at the end surface of the optical fiber 9, the reason for this being unavoidable deviations during manufacturing and mounting. A measuring member is connected to the opposite end of the light guide 3 for detection of the intensity of the light which exits from the light guide. The LED in the mounting ring can now be rotated and also axially displaced until maximum intensity is obtained in the light detected at the opposite end of the light guide. The LED is then in its maximum position and is fixed in relation to the housing by means of at least three welding points between the opening edge and the mounting ring, whereupon the current source is disconnected. Thereafter, the opening edge and the mounting ring are welded to each other by means of a welded joint 33 running around the whole opening edge, thus obtaining a hermetically sealed joint.

An advantageous welding method for use in the present invention is laser welding. During laser welding, the distance between two points to be welded to each other may not exceed 50 µm. Thus, it is a condition for a successful welding that the gap opening which is formed between the opening edge and the mounting ring does not exceed 50 µm. This gap opening will hereinafter be referred to as the welding gap. Measurements have shown that the LED needs to be adjusted maximally about 0.2 mm in each direction in the axial direction. For mounting reasons, the recess and the mounting ring cannot have exactly the same diameter, but the mounting ring must have a diameter which is somewhat smaller than the diameter of the recess. When the mounting ring before being adjusted is placed in the recess with its largest periphery on a level with the opening edge, a welding gap is formed which is at most 10 µm. In this example, the recess, and hence also the spherical part of the mounting ring, have a diameter d=D=5 mm. A movement of 0.2 mm in the axial direction of the mounting ring from the position at the beginning of the adjustment gives an increase of the welding gap of about 8 µm, that is, the welding gap becomes about 18 µm. Since it is not certain that the LED is centered in the recess, the welding gap may maximally be 2·18µm=36 µm, which is considerably less than 50 µm.

The calculation of the increase of the opening gap is performed as follows:

$$x^2+z^2=r^2 \text{ (the equation for a sphere)}$$

r=the radius of the sphere =2.5 mm
x=r−s
s=the gap width
z=the movement in the axial direction =0.2 mm $$(r-s)^2 + z^2 = r^2 \Rightarrow s = r - \sqrt{r^2 - z^2} \Rightarrow s = 8 \text{ µm}$$

If r=1.5 mm ⇒s=14 µm ⇒the maximum welding gap becomes 2·14 µm+20 µm=48 µm.

As will be clear from the above reasoning, the method is not suited for welding of semiconductor elements with too small dimensions. The size of the welding gap that may be bridged is, of course, dependent on which welding method is applied.

During the mounting according to the present invention method an opto-component in hermetically sealed joints is obtained with a fast and simple manner and an efficient adjustment is achieved.

The LED in the above example may, of course, consist of another optoelectronic semiconductor element, for example a laser diode or a photodetector.

The component described above is intended for connection to a light guide. However, the present invention is not limited to this case but may be applied and provide the same advantages also in connection with other fields of use.

I claim:

1. An optoelectronic component comprising:

a housing having a first body and a second, spherical body, and an optoelectronic semiconductor element mounted in said second, spherical body, said second, spherical body being adjustably journalled in a cylindrical recess of the first body, the cylindrical recess including an opening edge and the spherical body including a portion having substantially the same outer periphery diameter as the diameter of said cylindrical recess, said portion being at the level with the opening edge of the cylindrical recess, and a welded joint extending around the whole opening edge for providing a hermetically sealed joint between said opening edge and the portion.

2. An optoelectronic component according to claim 1, wherein said spherical body is annular and surrounds the optoelectronic semiconductor element.

3. An optoelectronic component according to claim 2, wherein the optoelectronic semiconductor element and the spherical body are joined together by a welded joint.

4. An optoelectronic component according to claim 2, wherein the optoelectronic semiconductor element and the spherical body are joined together by a welded joint running around the periphery of the whole semiconductor element, thus forming a hermetically sealed joint.

5. An optoelectronic component according to claim 1, wherein said housing includes means for connecting a light guide thereto, said light guide transmitting light from or to the optoelectronic semiconductor element.

6. A method of mounting an optoelectronic component having a housing with a first body, and a second, spherical body and an optoelectronic semiconductor element mounted in the second, spherical body, which is adjustably journalled in a cylindrical recess of the first body, the spherical body having a portion with the largest outer periphery diameter substantially corresponding to the diameter of the cylindrical recess, said method comprising the steps of:

arranging the optoelectronic semiconductor element in the spherical body, positioning the spherical body and the semiconductor element arranged therein in said cylindrical recess with said largest outer periphery portion being at the opening edge of said cylindrical recess, adjusting the orientation and position of the semiconductor element, and welding the spherical body at said largest outer periphery portion to the first body with a welded joint extending along the opening edge of the recess.

7. A method according to claim 6, wherein the opening edge and the spherical body are joined together by means of a welded joint running around the whole opening edge, thus obtaining a hermetically sealed joint.

8. A method according to claim 6, wherein the opening edge and the spherical body are first fixed to each other by a number of welding points and thereafter joined together by means of a welded joint running around the whole opening edge.

* * * * *